United States Patent [19]

Pilon

[11] 4,219,418
[45] Aug. 26, 1980

[54] WATER TREATMENT PROCESS

[76] Inventor: Jacques Pilon, 94, Duvernay, St-Jerome, Comte Terrebonne, Quebec, Canada

[21] Appl. No.: 917,570

[22] Filed: Jun. 21, 1978

Related U.S. Application Data

[63] Continuation of Ser. No. 505,521, Sep. 12, 1974, abandoned, which is a continuation-in-part of Ser. No. 364,706, May 29, 1973, abandoned.

[51] Int. Cl.² ............................ C02B 1/20; C02B 1/36
[52] U.S. Cl. ........................................ 210/50; 210/51; 210/53; 210/62; 162/29
[58] Field of Search ............. 210/15, 18, 4, 11, 50–53, 210/62, 63 R; 162/16, 29

[56] References Cited

U.S. PATENT DOCUMENTS

| | | | |
|---|---|---|---|
| 3,082,146 | 3/1963 | Wentworth et al. | 210/62 |
| 3,386,915 | 6/1968 | Rutschi et al. | 210/62 |
| 3,577,341 | 5/1971 | Keith, Jr. et al. | 210/53 |
| 3,705,098 | 12/1972 | Shepherd | 210/63 R |
| 3,711,402 | 1/1973 | Zumbrunn et al. | 210/63 R |
| 3,737,374 | 6/1973 | Stern et al. | 210/11 |

FOREIGN PATENT DOCUMENTS

| | | | |
|---|---|---|---|
| 646440 | 8/1962 | Canada | 210/63 R |
| 2521893 | 11/1975 | Fed. Rep. of Germany | 210/63 R |

*Primary Examiner*—Benoît Castel
*Attorney, Agent, or Firm*—Bacon & Thomas

[57] ABSTRACT

The present invention is concerned with a process for the purification of highly polluted water containing paper mill waste products and algae, which comprises: (a) treating said highly polluted water with hydrogen peroxide and alum; (b) allowing flocculation and then sedimentation to take place, while pre-chlorinating the treated water by subjecting it to the action of chlorine during flocculation or after sedimentation, or both; (c) filtrating the resulting water to remove therefrom solid particles still in suspension; and (d) post-chlorinating the filtrated water by treating it with a liquid composition obtained by mixing chlorine, an alkali metal chlorate and a non-toxic mineral acid. The water treatment process according to the invention enables one to obtain a drinking water which is colorless, odorless and from which bad tastes have been eliminated.

22 Claims, 1 Drawing Figure

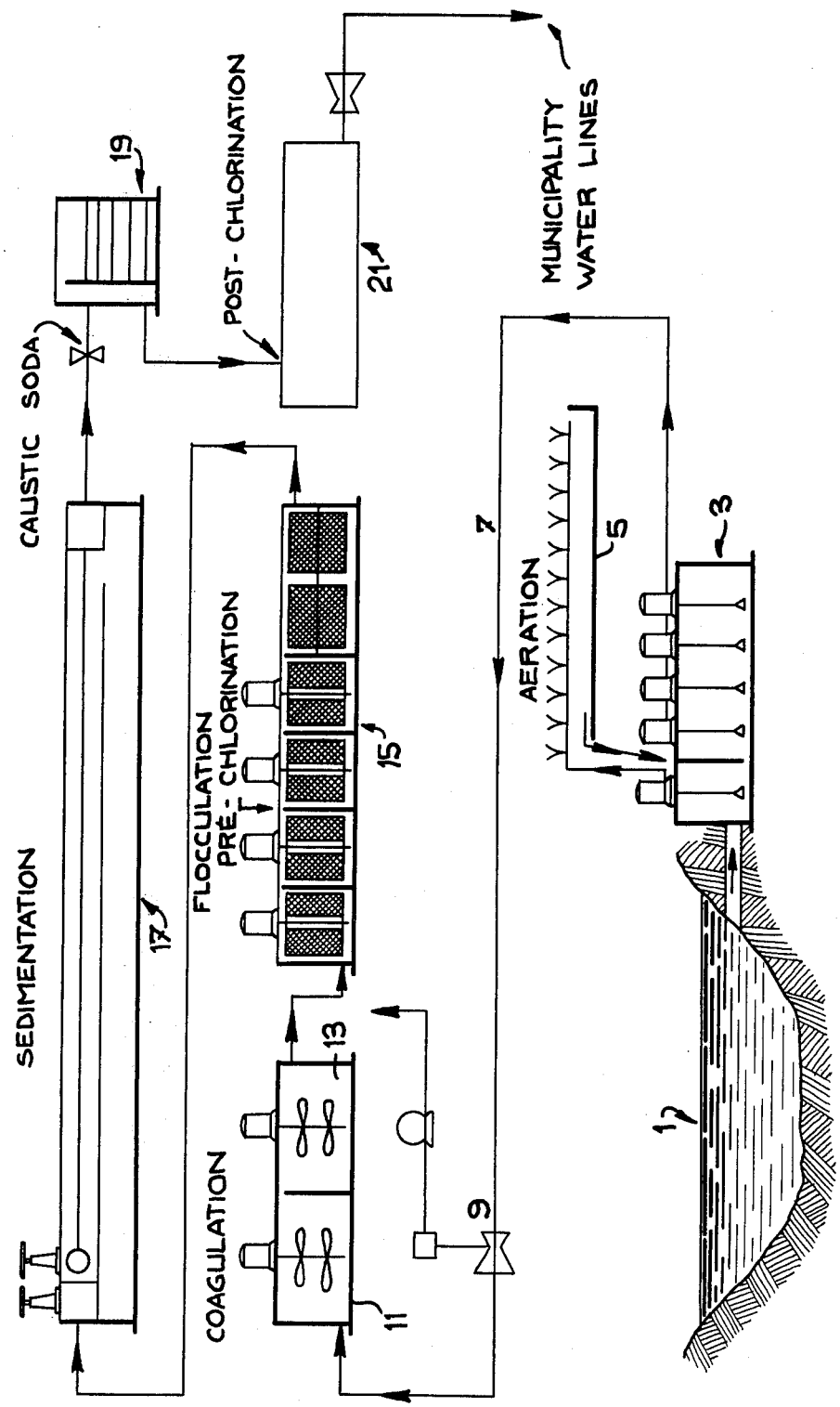

WATER TREATMENT PROCESS

This is a continuation, of application Ser. No. 505,521, filed Sep. 12, 1974, which is a continuation-in-part of Ser. No. 364,706 filed May 29, 1973 both now abandoned.

The present invention relates to a water treatment process. More particularly, the invention is directed to a process for the purification of highly polluted water containing substantially large quantities of paper mill wastes and algae, to produce a water which is suitable for human consumption.

It is well known that the water which is used for drinking, cooking or other domestic uses, must be safe for human consumption as well as tasty and attractive to the eye. This water must also be free of pathogenic organisms; it should not contain deleterious chemical and radioactive substances and should be free of undesirable colour, taste and smell. Other considerations, such as corrosiveness, a tendency to produce scaling, and hardness which leads to an excessive consumption of soap, are also important factors in determining whether a water is of good quality.

In other words, drinking water should be purified to such an extent that it is more pleasant and more wholesome to drink. In addition, many waters are entirely unfitted for industrial use without purification.

Various processes are known for purifying water. According to a process which is commonly used, the water to be purified is first subjected to a prechlorination carried out by treating the water with chlorine, alum and optionally a base such as soda or lime; the alum and the base are usually added in order to assist the ensuing flocculation. It should be pointed out that if the natural alkalinity of the water is sufficient to coagulate when alum is added, the addition of a base is not required. After a certain period of time during which the solid particles are flocculated, there is a sedimentation period which is followed by a filtration to remove the solid particles still suspended in the water. The next step involves a post-chlorination which is merely a second addition of chlorine after which the pH is corrected, and the water thus purified is ready for consumption.

The above process presents many disadvantages. For instance, during the prechlorination, many industrial waste products are chlorinated to form undesirable so-called chloro-compounds which cannot easily be removed during the sedimentation and filtration which fillow. Even postchlorination cannot remove most of these chloro-compounds. The result is that a water is obtained which is not satisfactory with respect to taste and smell and which contains impurities which are detrimental even for industrial use. It would also appear that the known process described above is not capable of producing completely satisfactory coagulation, flocculation and sedimentation because it cannot completely eliminate all the bacteria of filamentous structure.

Paper mill wastes produce highly odorous and bad tasting water when treated with chlorine. The chlorination of the phenolic or cyclic compounds contained in these waste waters produce the corresponding chloro-compounds which have a bad taste and are odor-producing in drinking water. As noted above, these compounds cannot be efficiently removed by known processes. In addition, such industrial wastes generally also contain sulfides which chlorine fails to oxidize to a satisfactory result. In this respect, it is known that hydrogen sulfide must be eliminated from polluted water in order to reduce corrosion of metal and concrete water lines, caused by oxides of sulfur resulting from sulfide oxidation.

The use of chlorine dioxide to destroy taste- and odor-producing compounds by oxidation is well known. The process has been successful in the control of certain phenolic tastes and odors but has not, however, been effective in eliminating tastes and odors incidental to the presence of paper mill wastes and only partial success has been reported so far in the elimination of tastes and odors incidental to algae growths.

Ozone is another of the water treatment materials which combine germicidal value with effectiveness in taste and odor control. Experience has demonstrated that ozone will completely remove some types of tastes and odors present in a water supply. However, in certain applications involving treatment of waters heavily polluted by industrial wastes and, in particular, by paper mill wastes, it has been found that while ozone treatment is effective in reducing odors to a certain extent, it tends to "fix" the remaining odor in such a way that the latter resists complete elimination.

Bleaching clay has also been utilized in the removal of tastes and odors which are particularly incidental to oil refinery wastes. Tests have indicated, however, little or no adsorption of phenol which is one of the worst ingredients to produce bad taste in the presence of chlorine in drinking water.

The subject invention proposes to overcome the aforementioned drawbacks and to provide an odorless and colorless drinking water. The bad taste and odor produced by paper mill waste products treated with chlorine are entirely eliminated by the process according to the present invention.

The process according the invention comprises the following steps:

(a) treating highly polluted water with hydrogen peroxide and alum;

(b) allowing flocculation and then sedimentation to take place, while pre-chlorinating the treated water by introducing chlorine therein either during the flocculation or after the sedimentation, or both, (c) filtrating the resulting water to remove therefrom solid particles still in suspension, and (d) post-chlorinating the filtrated water by treating it with a liquid composition obtained by mixing chlorine, an alkali metal chlorate and non-toxic mineral acid.

It will be realized that the process according to the present invention does not intend to eliminate all treatments with chlorine. On the contrary, the present process proposes to make the chlorinating treatments more efficient throughout the entire purification process and it has been found that it is especially adapted for treating highly polluted water containing substantial quantities of paper mill wastes and algae.

The invention therefore resides in a pre-treatment which preceeds the pre-chlorination and in a post-treatment which is combined with the post-chlorination.

According to the invention, the polluted water is first treated with hydrogen peroxide in order to oxidize the phenols and sulfides contained therein, before it is chlorinated in the following step. In this manner, it is possible to prevent the formation of chlorinated phenols and all undesirable so-called chloro-compounds, such as those which are produced during the conventional chlorination of paper mill wastes and against which chlorine and even chlorine dioxide have never been found to be entirely satisfactory oxidizing agents.

Hydrogen peroxide is generally utilized in amounts comprised between 1 and 10 p.p.m.; however, it can also be used in excess without departing from the present invention. The preferred range is 2.5 to 7.5 p.p.m., and particularly advantageous results are obtained with 5 p.p.m. of hydrogen peroxide. The raw water is usually subjected to the hydrogen peroxide action for a period of approximately 30 minutes. In the present specification, amounts expressed in p.p.m. are calculated by weight with respect to the quantity of water being treated.

The alum which is used in combination with the hydrogen peroxide, is utilized as a coagulation agent for allowing the flocculation of solid particles to take place. It is generally used in amounts ranging from 22 to 30 p.p.m., and preferably from 28 to 30 p.p.m.

When the natural alkalinity of the water to be treated is not sufficient to coagulate in the presence of alum, a base such as sodium hydroxide or lime is added. The base is used for controlling the pH of the medium so that optimum coagulation and ensuing flocculation results are obtained. The optimum coagulation pH has been determined to be of approximatively 6.1 and, therefore, the base should be added in sufficient amount to raise and maintain the pH at that particular value.

In addition to the action of alum, a cationic polyelectrolyte such as Aquafloc 464 (Trademark; Dearborn Chemicals) may also be used in order to assist in coagulation.

The thus treated water is then subjected to a prechlorinating treatment which can be carried out either during the flocculation or after the sedimentation, or both. According to a preferred embodiment, chlorine is added during the flocculation in an amount ranging from 1 to 5 p.p.m., as well as directly after the sedimentation in a lesser amount, i.e. 1.0 p.p.m. A prechlorination effected during flocculation will assist in the removal of algae as the dead cells of these organisms are more readily coagulated. In all cases, it is to be understood that prechlorination is chlorination prior to filtration; it is usually carried out for a period of at least 2 hours.

After sedimentation, the pH of the water is reestablished to an equilibrium value of about 8.3 by the addition of a base such as caustic soda, which may be effected either prior to filtration or immediately thereafter.

When the solid particles still suspended in the water resulting from the sedimentation have been removed by filtration, the filtrated water is then subjected to a post-chlorination which is carried out by treating the water not with chlorine alone but rather with a liquid composition resulting from the mixture of chlorine, an alkali metal chlorate and a non-toxic mineral acid. As alkali metal chlorate and non-toxic mineral acid, use is preferably made of sodium chlorate and sulfuric acid respectively since these compounds are inexpensive and readily available. The liquid composition is generally obtained starting from 2.5 to 5% by volume aqueous solutions of sulfuric acid and 3% by weight aqueous solutions of sodium chlorate; chlorine is injected at a controlled flow rate into a solution formed by mixing these solutions, to produce a liquid composition which is then used in an amount required for the water being treated.

By mixing the above components together, a colorless transparent very gaseous liquid is obtained, which generates large quantities of molecular and nascent oxygen. The following reactions are believed to take place:

$$H_2O + Cl_2 \rightarrow Cl_2.H_2O \rightarrow 2HCl + 0° \uparrow \quad (1)$$

$$HCl + NaClO_3 + H_2SO_4 \rightarrow NaHSO_4 + O_2 \uparrow + 0° \uparrow + 2HCl \quad (2)$$

If $ClO_2$ is produced, the following reaction occurs:

$$2ClO_2 + 2NaClO_3 + H_2SO_4 + H_2O \rightarrow Na_2SO_4 + 4HCl + 5O_2 \uparrow + 0° \uparrow \quad (3)$$

According to the first reaction, chlorine which is introduced into water forms chlorine-water having a yellowish color, which eventually breaks down into hypochlorous acid HClO which is unstable and further breaks down into HCl and nascent oxygen. In the second reaction, the hydrochloric acid formed by the first reaction does not actually take part on account of the fact sodium chlorate reacts with sulfuric acid to produce sodium sulfate, hydrochloric acid and molecular and nascent oxygen. Finally, the third reaction shows if by any chance chlorine dioxide was produced: chlorine dioxide in the presence of sodium chlorate and sulfuric acid yields sodium sulfate, hydrochloric acid, molecular and nascent oxygen. It is also to be noted that reactions (1), (2) and (3) are irreversible.

According to a preferred embodiment, hydrogen peroxide is also admixed with the above ingredients and has proven to increase the quantity of molecular and nascent oxygen generated. The use of hydrogen peroxide in the post-chlorination further eliminates residual odors and tastes associated with chlorine. In such case, a 2.5% by volume aqueous solution of hydrogen peroxide is used in combination with the aforesaid aqueous solutions of sulfuric acid and sodium chlorate.

According to a further embodiment of the invention, the filtrated water is treated with a liquid composition resulting from the mixture of 1.0 p.p.m. of chlorine, 1.0 p.p.m. of sodium chlorate, 1.6 p.p.m. of sulfuric acid and 0.8 p.p.m. of hydrogen peroxide, the amount of each being calculated by weight with respect to the quantity of the water being treated. Particularly advantageous results are however obtained with 1.0 p.p.m. of each of these ingredients and, in some cases, with 1.0 p.p.m. of chlorine and 0.5 p.p.m. of the remaining ingredients.

The absence of yellowish color in the resulting liquid composition is proof that chlorine dioxide does not exist in the presence of the aforesaid ingredients. The generated nascent oxygen is the active reactant in the post-chlorination according to the invention. Nascent oxygen being the strongest oxidizing agent known, any paper mill waste products having resisted the former hydrogen peroxide treatment and possibly having been transformed into their corresponding chloro-compounds by the chlorine treatment in the pre-chlorination, are completely oxidized in the post-chlorinating step according to the invention.

The water treatment process according to the invention therefore enables the production from a highly polluted water of a drinking water which is colorless, odorless and from which bad tastes have been eliminated. The process is the least costly treatment per 1,000 gallons of drinking water.

The invention will now be illustrated with reference to the accompanying drawing in which:

The single FIGURE is a schematic diagram of a filtration plate embodying a process according to the present invention.

The source of water is a river 1 in which the water has been polluted with paper mill waste products. The water is pumped from the river by means of a pumping station 3 to be circulated in a close circuit 5 where it is aerated. The water is then sent, via conduit 7, through venturi 9, to coagulation baths 11 and 13 where, in bath 11, are added hydrogen peroxide and alum in the respective proportions of 5 p.p.m. and 28 to 30 p.p.m. and enough caustic soda to raise and maintain the pH at 6.1. The water is further treated in bath 13 with Aquafloc 464 (Trademark) in order to assist in coagulation. The water is so treated with these reagents for a total period of about 30 minutes before it is subjected to pre-chlorination which is carried out during flocculation in baths 15. Chlorine is introduced in an amount of from 1 to 5 p.p.m. at a location approximatively mid-way along the length of the flocculation baths 15.

After flocculation and pre-chlorination, the water enters sedimentation bath 17 where the heavier solid particles are allowed to sink to the bottom. The sludge formed is removed approximatively every 3 to 6 months. No sludge is formed in baths 11, 13 and 15 due to the continuous flow of the water and the mixing occuring in these baths.

The pH of the water is then reestablished to an equilibrium value of 8.3 by the addition of caustic soda and, after filtration at 19, the water is introduced into a reservoir 21 where post-chlorination takes place. The filtrated water is treated in reservoir 21 with a liquid composition resulting from the mixture of 1 p.p.m. of chlorine, 1 p.p.m. of $NaClO_3$, 1 p.p.m. of $H_2SO_4$ and 1 p.p.m. of $H_2O_2$, the amount of each being calculated by weight with respect to the quantity of water being treated. The water is so treated for the period during which it is stored in reservoir 21 before being sent into the municipality water lines; this period is of approximatively 24 hours.

The results of the analyses carried out on the water thus purified are reported in the accompanying Tables 1 and 2.

Table 1, wherein the bacteriological water analysis is reported, shows that the water treated according to the process of the invention contains no pathogens; a water having a content of pathogenic organisms in an excess of 200 per ml is totally unsafe for human consumption. The Table further indicates that the water, once flocculated, contains relatively very small amounts of bacteriae with respect to the raw water, thereby confirming the effectiveness of the hydrogen peroxide treatment and pre-chlorination of the process according to the invention.

In Table 2 are reported the various proportions of the ingredients used in the water treatment according to the invention, and the physico-chemical characteristics of the treated water compared with those of the raw water and the water located above the filters. According to the invention, purified water is obtained which has an approximate turbidity value of 0.05 JTU, residual chlorine content of 0.07 p.p.m, odor value of 1.0 TON and color value of 0 CU. Odor and color values of 1.0 TON and 0 CU respectively indicate that the water is odorless and colorless; an odor value comprised between 1.4 and 2 TON would result in a quite noticeable odor. A low residual chlorine content of 0.07 p.p.m. is very good; a concentration about 0.2 p.p.m. results in slight chlorinous tastes and odors. Finally, the turbidity value of 0.05 TON falls well within the range of 0–0.2 TON rated for excellent water.

TABLE 1

| | (Bacteriological Water Analysis) | | |
|---|---|---|---|
| Test No | Type of water | Coliforms/ 100 ml | Fecal coliforms/ 100 ml | Streptococcus /100 ml |
| 1 | untreated | >200 | 252 | 200 |
| 1 | flocculated | 6.2 | 3.7 | <2 |
| 1 | treated | 0 | 0 | <2 |
| 2 | untreated | >160 | >160 | 160 |
| 2 | flocculated | 54 | 54 | 5.1 |
| 2 | treated | 0 | 0 | <2 |
| 3 | untreated | >200 | >160 | >160 |
| 3 | flocculated | 7.9 | 7.9 | — |
| 3 | treated | 0 | 0 | <2 |
| 4 | untreated | >1000 | >200 | >200 |
| 4 | flocculated | 1.8 | 1.8 | <2 |
| 4 | treated | 0 | 0 | <2 |

TABLE 2

| | A | | | B | C | D | TURBIDITY (JTU) | | | RESIDUAL CHLORINE (ppm) | | ODOR (TON) | | COLOR (CU) | |
|---|---|---|---|---|---|---|---|---|---|---|---|---|---|---|---|
| Test No. | $H_2O_2$ (ppm) | Alum (ppm) | NaOH (ppm) | $Cl_2$ (ppm) | NaOH (ppm) | MIXTURE of $Cl_2$, $NaClO_3$, $H_2SO_4$, $H_2O_2$ | R | TF | T | TF | T | R | T | R | T |
| 1 | 5.0 | 21 | 2.8 | 1.0 | 7.0 | 2.0/2.0/2.0/2.0 | 6.7 | 0.30 | 0.050 | 0.050 | 0.075 | 3.0 | 1.0 | 50 | 0 |
| 2 | 5.0 | 21 | 2.8 | 2.0 | 7.0 | 2.0/2.0/2.0/2.0 | 3.8 | 0.22 | 0.057 | 0.050 | 0.075 | 3.0 | 1.0 | 30 | 0 |
| 3 | 5.0 | 25 | 2.8 | 2.5 | 7.0 | 1.5/1.5/1.5/1.5 | 7.5 | 0.20 | 0.058 | 0.075 | 0.100 | 3.0 | 1.0 | 60 | 0 |
| 4 | 5.0 | 29 | 5.6 | 3.0 | 7.0 | 1.0/1.0/1.0/1.0 | 4.4 | 0.30 | 0.057 | 0.050 | 0.075 | 3.0 | 1.0 | 35 | 0 |

A: Coagulation
B: Pre-chlorination
C: pH reestablishment to 8.3
D: Post-chlorination (amount given in ppm calculated by weight with respect to the quantity of water being treated)
R: Raw water
TF: Water at top of filters
T: Treated water
JTU: Jackson Turbidity Unit
TON: Threshold Odor Number
CU: Color Unit

I claim:
1. A process for the production of odorless and colorless drinking water from polluted water containing papermill waste products and algae, which comprises:
   (a) treating said highly polluted water with hydrogen peroxide in an amount of from 1 to 10 p.p.m. calculated by weight with respect to the quantity of water being treated and alum;
   (b) allowing flocculation and then sedimentation to take place, while pre-chlorinating the treated water by subjecting it to the action of chlorine;

(c) filtrating the resulting water to remove therefrom solid particles still in suspension; and, (d) post-chlorinating the filtrated water by treating it with a liquid composition resulting from the mixture of 1.0 p.p.m. of chlorine, 0.5 to 1.0 p.p.m. of an alkali metal chlorate, 0.5 to 1.6 p.p.m. of a non-toxic mineral acid, and 0.5 to 1.0 p.p.m. of hydrogen peroxide, the amount of each being calculated by weight with respect to the quantity of water being treated.

2. Process according to claim 1, wherein said alkali metal chlorate is sodium chlorate and said non-toxic mineral acid is sulfuric acid.

3. Process according to claim 2, wherein said liquid composition is obtained starting from a mixture of a 2.5 to 5% by volume aqueous solution of sulfuric acid, a 3% by weight aqueous solution of sodium chlorate and a 2.5% by volume aqueous solution of hydrogen peroxide, in which chlorine has been injected at a controlled flow rate.

4. Process according to claim 1, wherein said filtrated water is treated with a liquid composition resulting from the mixture of 1.0 p.p.m. of chlorine, 1.0 p.p.m. of sodium chlorate, 1.6 p.p.m. of sulfuric acid and 0.8 p.p.m. of hydrogen peroxide, the amount of each being calculated by weight with respect to the quantity of water being treated.

5. Process according to claim 1, wherein said filtrated water is treated with a liquid composition resulting from the mixture of 1.0 p.p.m. of chlorine, 1.0 p.p.m. of sodium chlorate, 1.0 p.p.m. of sulfuric acid and 1.0 p.p.m. of hydrogen peroxide, the amount of each being calculated by weight with respect to the quantity of water being treated.

6. Process according to claim 1, wherein said filtrated water is treated with a liquid composition resulting from the mixture of 1.0 p.p.m. of chlorine, 0.5 p.p.m. of sodium chlorate, 0.5 p.p.m. of sulfuric acid and 0.5 p.p.m. of hydrogen peroxide, the amount of each being calculated by weight with respect to the quantity of water being treated.

7. Process according to claim 1, wherein said amount of hydrogen peroxide used to treat said highly polluted water is comprised between 2.5 and 7.5 p.p.m.

8. Process according to claim 7, wherein said amount of hydrogen peroxide used to treat said highly polluted water is 5.0 p.p.m.

9. Process according to claim 1, wherein said highly polluted water is subjected to the hydrogen peroxide action for a period of approximately 30 minutes.

10. Process according to claim 1, wherein said highly polluted water is treated with alum in an amount of from 22 to 30 p.p.m. calculated by weight with respect to the quantity of water being treated.

11. Process according to claim 10, wherein said amount of alum is comprised between 28 and 30 p.p.m.

12. Process according to claim 1, wherein said highly polluted water is treated with hydrogen peroxide and alum in the presence of a base.

13. Process according to claim 12, wherein said base is caustic soda or lime.

14. Process according to claim 12, wherein said base is added in an amount such as to maintain a coagulation pH of approximately 6.1.

15. Process according to claim 1, wherein pre-chlorination is effected during flocculation.

16. Process according to claim 15, wherein said treated water is subjected to the action of chlorine in an amount of from 1 to 5 p.p.m. calculated by weight with respect to the quantity of water being treated.

17. Process according to claim 1, wherein pre-chlorination is effected during flocculation and after sedimentation.

18. Process according to claim 17, wherein said treated water is subjected to the action of chlorine first during flocculation where chlorine is used in an amount of from 1 to 5 p.p.m., and then after sedimentation where chlorine is used in an amount of 1.0 p.p.m., said amounts being calculated by weight with respect to the quantity of water being treated.

19. Process according to claim 1, wherein after sedimentation a base is added in an amount such as to reestablish the pH of the water to an equilibrium value of approximately 8.3.

20. Process according to claim 19, wherein said addition of base is effected prior to filtration.

21. Process according to claim 1, wherein pre-chlorination is effected after sedimentation.

22. Process according to claim 1, wherein the water containing paper mill waste products include phenolic or cyclic compound.

* * * * *